(12) United States Patent
Fatica et al.

(10) Patent No.: US 11,988,075 B2
(45) Date of Patent: May 21, 2024

(54) OFFSHORE ASSEMBLY AND OIL AND GAS PRODUCTION SYSTEM AND METHOD COMPRISING SUCH OFFSHORE ASSEMBLY

(71) Applicant: SAIPEM S.P.A., Milan (IT)

(72) Inventors: Giulio Fatica, Milan (IT); Stephane Rigaud, Milan (IT); Thierry Delahaye, Milan (IT); Benjamin Mauries, Milan (IT); Giorgio Arcangeletti, Milan (IT)

(73) Assignee: SAIPEM S.P.A., Milan (IT)

( * ) Notice: Subject to any disclaimer, the term of this patent is extended or adjusted under 35 U.S.C. 154(b) by 0 days.

(21) Appl. No.: 17/928,517

(22) PCT Filed: Jul. 1, 2021

(86) PCT No.: PCT/IB2021/055917
§ 371 (c)(1),
(2) Date: Nov. 29, 2022

(87) PCT Pub. No.: WO2022/003621
PCT Pub. Date: Jan. 6, 2022

(65) Prior Publication Data
US 2023/0203920 A1    Jun. 29, 2023

(30) Foreign Application Priority Data
Jul. 1, 2020    (IT) .................. 102020000015913

(51) Int. Cl.
*E21B 43/017* (2006.01)
*E21B 41/00* (2006.01)
*F03D 13/25* (2016.01)

(52) U.S. Cl.
CPC ........ *E21B 43/017* (2013.01); *E21B 41/0085* (2013.01); *F03D 13/25* (2016.05); *F05B 2240/95* (2013.01)

(58) Field of Classification Search
CPC .... E21B 43/017; E21B 41/0085; F03D 13/25; F05B 2240/95; F05B 2240/93;
(Continued)

(56) References Cited

U.S. PATENT DOCUMENTS

| 2019/0233060 A1* | 8/2019 | Moffat ...................... G06N 3/08 |
| 2020/0199894 A1* | 6/2020 | Soerensen ............... E04G 3/305 |
| 2020/0298938 A1* | 9/2020 | Loyns ..................... E21B 15/02 |

FOREIGN PATENT DOCUMENTS

| DE | 20 2014 004373 U1 | 6/2014 |
| EP | 3 436 336 A1 | 2/2019 |

(Continued)

OTHER PUBLICATIONS

Notification Concerning Submission, Obtention or Transmittal of Priority Document for International Application No. PCT/IB2021/055917 dated Oct. 7, 2021.
(Continued)

*Primary Examiner* — James G Sayre
(74) *Attorney, Agent, or Firm* — Neal, Gerber & Eisenberg LLP

(57) ABSTRACT

An offshore assembly to operate a facility, in particular an underwater oil and gas production facility. The offshore assembly has: a semi-submersible support structure arranged in a body of water and having at least one tubular portion; a wind turbine to generate electricity and equipped with a tower, a nacelle and a blade assembly. The offshore assembly also has at least one back-up power source mounted on the semi-submersible support structure to generate electricity. A plurality of compartments are stacked on top of each other within the tubular portion. Each of the compartments is dedicated to housing respective equipment (Continued)

to perform respective functions, and a cooling and ventilation system cools and ventilates the plurality of compartments.

17 Claims, 7 Drawing Sheets

(58) Field of Classification Search
CPC ..... F05B 2260/42; Y02B 10/30; Y02E 10/72; Y02E 10/727; Y02P 70/50; B63B 35/44; B63B 2035/446
See application file for complete search history.

(56) References Cited

FOREIGN PATENT DOCUMENTS

| | | | | |
|---|---|---|---|---|
| GB | 2383978 A | 7/2003 | | |
| GB | 2546251 A | 7/2017 | | |
| WO | WO-2009040442 A1 * | 4/2009 | ............. | E21B 43/16 |
| WO | WO 2009/068712 A1 | 6/2009 | | |
| WO | WO 2016/125114 A1 | 8/2016 | | |
| WO | WO 2017/122172 A1 | 7/2017 | | |
| WO | WO 2019/106283 A1 | 6/2019 | | |
| WO | WO-2021158210 A1 * | 8/2021 | ......... | B01D 19/0031 |

OTHER PUBLICATIONS

International Search Report and Written Opinion for International Application No. PCT/IB2021/055917 dated Oct. 13, 2021.
Six Notifications of the Recording of a Change for International Application No. PCT/IB2021/055917.

\* cited by examiner

OFFSHORE ASSEMBLY AND OIL AND GAS PRODUCTION SYSTEM AND METHOD COMPRISING SUCH OFFSHORE ASSEMBLY

PRIORITY CLAIM

This application is a national stage application of PCT/IB2021/055917, filed on Jul. 1, 2021, which claims the benefit of and priority to Italian Patent Application No. 102020000015913, filed on Jul. 1, 2020, the entire contents of which are each incorporated by reference herein.

TECHNICAL FIELD

This disclosure relates to an offshore assembly for operating facilities, in particular facilities belonging to an underwater oil and gas production facility. In this description, the term "production" refers to the extraction and/or other operations performed on oil and gas comprising at least separation, pumping, and injection of water into the reservoir.

BACKGROUND

The extraction of oil and gas from underwater wells has significantly developed in the last few decades and the technology for optimizing the management and the relative costs of extracting oil and gas coming from undersea wells are rapidly evolving.

The current trend is to confine as many operations as possible to a bed of a body of water in the vicinity of wells as illustrated in patent applications WO 2016/125,114 and WO 2017/122,172. These documents show underwater oil and gas production facilities in which several devices are used that use pumps and compressors and are selectively interconnected by ducts and electrically controlled valves. The facilities described in these documents also perform the function of injecting chemicals into the wells or directly into the oil and gas to vary the features of the oil and gas and facilitate the transport or extraction thereof.

In light of the above, the underwater oil and gas production facilities must be powered with electricity and with the chemicals necessary to operate the underwater facilities themselves.

The further away the underwater oil and gas production facility is from the power source and chemicals storage place, the relative more complex and onerous are the supply of energy and of chemicals to the underwater oil and gas production facilities.

Many documents, including WO 2019/106,283, GB 2,546,251, GB 2,383,978, and WO 2009/068,712 suggest producing electricity by an offshore assembly comprising a semi-submersible support structure and at least one electric generator mounted on the semi-submersible support structure. An offshore assembly of these types may be arranged near the underwater oil and gas production facility and, thus, avoid complexity in distributing power from remote sites and for relatively long distances.

However, certain offshore assemblies have certain drawbacks in terms of making the electricity produced readily usable for the facility and related to the supply chemicals to the facility itself.

SUMMARY

The purpose of this disclosure is to provide an offshore assembly that can mitigate certain of the drawbacks of certain of the prior art.

According to this disclosure, an offshore assembly is provided to operate a facility, in particular an underwater oil and gas production facility, the offshore assembly comprising: a semi-submersible support structure arranged in a body of water and comprising at least one tubular portion; a wind turbine to generate electricity and equipped with a tower, a nacelle and a blade assembly; and at least one back-up power source mounted on the semi-submersible support structure to generate electricity; a plurality of compartments stacked on top of each other within the tubular portion, in which each of the compartments is dedicated to housing respective equipment to perform respective functions; and a cooling and ventilation system to cool and ventilate the plurality of compartments. In this way, the relatively conveniently cooled and ventilated compartments can house equipment for transforming and controlling electricity, equipment for controlling and operating the underwater oil and gas production facility, and equipment for storing chemicals and distributing the chemicals, some of which are relatively highly flammable, in relative complete safety.

In addition, the assigning of specific functions to each compartment can be done by following a logic aimed at maximizing the relative safety of the offshore assembly. In this case, the relatively most dangerous activities, such as the storage of flammable materials, is concentrated in the lower part of the tubular portion.

In particular, the tubular portion has a cylindrical wall, which laterally delimits the compartments.

From a practical point of view, the compartments are relatively easy to produce in that the cylindrical wall of the tubular portion defines the lateral wall of all the compartments. The cylindrical wall of the tubular portion is hermetic and relatively free of any communication with the outside because the tubular portion of the semi-submersible structure is designed to be partially submerged when in use. The only exception is defined by an access door at a height so as not to be affected by the submersion of the tubular portion in the body of water.

In particular, the offshore assembly comprises a number of partitions housed in the tubular portion for delimiting the compartments above and below. In this way, to create the compartments, it's enough to fix the partitions, which function as a floor and/or ceiling, to the cylindrical wall and at a distance from each other.

In particular, the offshore assembly comprises ducts for enabling people to pass through and access various compartments for which the partitions comprise first openings to enable the passage of the ducts.

In practice, the compartments are made so that they communicate to enable the transfer of people or things between various compartments.

In particular, the offshore assembly comprises a mobile lift along the tubular portion, for which the partitions comprise second openings to enable the passage of the lift between the compartments.

In practice, the compartments are made so that they communicate to enable the passage of the lift, which makes it possible to transport people, small spare parts, and tools for carrying out maintenance on the equipment housed in the compartments.

In particular, the partitions comprise third openings to enable the passage of bigger equipment. Thus, it is possible to perform maintenance operations that require the replacement of components.

In particular, the offshore assembly comprises at least two J-tubes extending partly into the body of water and partly within the tubular portion and through a number of partitions of the number of partitions; each J-tube being configured to house an umbilical or a cable.

In practice, some compartments are made so that they communicate to enable the passage of an umbilical or a cable for transferring electricity and/or signals and/or, respectively, chemicals in their liquid state and/or hydraulic fluids off the offshore assembly.

In particular, a partition comprises a pocket configured to house and to be joined to the lower end of the tower of the wind turbine.

In particular, the offshore assembly comprises a platform, which is arranged about the tubular portion and is configured to house at least one back-up power source.

The back-up power source has the function of supplementing the electricity generated by the electric generator and avoiding discontinuity in the supply of electricity to the underwater oil and gas production facility.

The back-up power source comprises a reserve generator that is operated by an endothermic engine so that the generation of electricity is not completely dependent on renewable resources, the availability of which is variable and often irregular.

It should be appreciated that housing the endothermic engine on the platform facilitates the evacuation of the exhaust gases.

Alternatively, the back-up power source comprises fluid cells, a solar-powered generator, and energy storage units.

In particular, the offshore assembly comprises lifting gear supported by the platform.

The platform is fixed around the upper part of the tubular portion at such as height that it is not submerged in the body of water. One of the partitions is arranged at the same height as the platform so as to be coplanar with the platform. The cylindrical wall has an access door to enable the transfer of people or things between the platform and the partition.

In accordance with the lifting gear, materials can be transferred from vessels moored to the semi-submersible support structure.

The semi-submersible support structure is, in addition, provided with a ladder that enables the transfer of people between the platform and a vessel moored to the semi-submersible support structure.

Another purpose of this disclosure is to provide an oil and gas production system for a reservoir located in a bed of water that is free of certain of the drawbacks of certain of the prior art.

In accordance with this disclosure, an oil and gas production system from a reservoir located in a bed of water is provided, the oil and gas production system comprising: an underwater oil and gas production facility, which is located on the bed of the body of water, is electrically operated and provides treatments comprising the injection of chemicals; and an offshore assembly of the present disclosure to supply electricity and chemicals through at least one umbilical to the underwater oil and gas production facility. In this way, the oil and gas production system is made independent of external sources as far as regards the supply of power and chemicals and it is able to operate for remote reservoirs, facilitating the exploitation thereof.

In particular, the system comprises static electrical power equipment to make the electricity produced by the wind turbine and/or the back-up power source available to facilities, the static electrical power equipment being housed in at least one compartment. In this way, the electricity is transformed and controlled for the equipment housed in the various compartments of the offshore assembly and the underwater oil and gas production facility to be able to use it.

In particular, the system comprises a control unit for managing the operations of the wind turbine, the back-up power source, and the underwater oil and gas production facility, the control unit being housed in at least one compartment. In this way, the control and management of the equipment supported by the semi-submersible support structure and the underwater oil and gas production facility is performed on board the semi-submersible support structure itself. In each case, the control unit communicates with a main control unit run by operators and arranged in a remote location from the oil and gas production system.

In particular, the system comprises tanks configured to contain chemicals and housed in at least one dedicated compartment. In this way, the supply of chemicals to the underwater oil and gas production facility and the supply of chemicals to the tanks are made relatively simple.

In particular, each compartment has a circular shape in plan and a cylindrical lateral wall; each tank having a cylindrical outer wall parallel to the cylindrical wall of the compartment. In this way, the space available in the compartment can be optimized.

Alternatively, the tanks may have a prismatic shape.

The choice of tank shape depends on the circumstances and overall layout of the compartment.

In particular, the back-up power source is an electric generator driven by an endothermic engine, and the system comprises a fuel tank housed in a compartment located in the lower part of the tubular portion.

The endothermic engine supplements the wind turbine's electricity production, which can be fluctuating and discontinuous.

In particular, the system comprises at least one additional offshore assembly connected to the offshore assembly by an umbilical.

In practice, it is possible to connect two or more offshore assemblies to dimension the supply of energy according to the system's requirement.

Another purpose of this disclosure involves providing a method of production of hydrocarbons near a reservoir located on the bed of a body of water that is free of certain of the drawbacks of certain of the prior art.

In accordance with this disclosure, a method of production of hydrocarbons from a reservoir located in a bed of water is provided, the production method comprising: extracting hydrocarbons from at least one well in a bed of the water body by an underwater oil and gas production facility, which is located on the bed of the water body and is electrically driven and involves the injection of chemicals; and supplying electricity and chemicals from an offshore assembly of the present disclosure through at least one umbilical to the underwater oil and gas production facility. In this way, the management of the underwater oil and gas production system is relatively simplified, especially for wells that are a relatively long way from solid ground.

In particular, the method involves controlling the underwater oil and gas production facility by a control unit located in one of the compartments and connected to the underwater oil and gas production facility by at least one umbilical. In this way, controlling the underwater production facility is relatively simplified.

BRIEF DESCRIPTION OF THE FIGURES

Additional features and advantages of this disclosure will be apparent from the following description of a non-limiting embodiment thereof, with reference to the accompanying figures, wherein.

DETAILED DESCRIPTION

Figure 1:
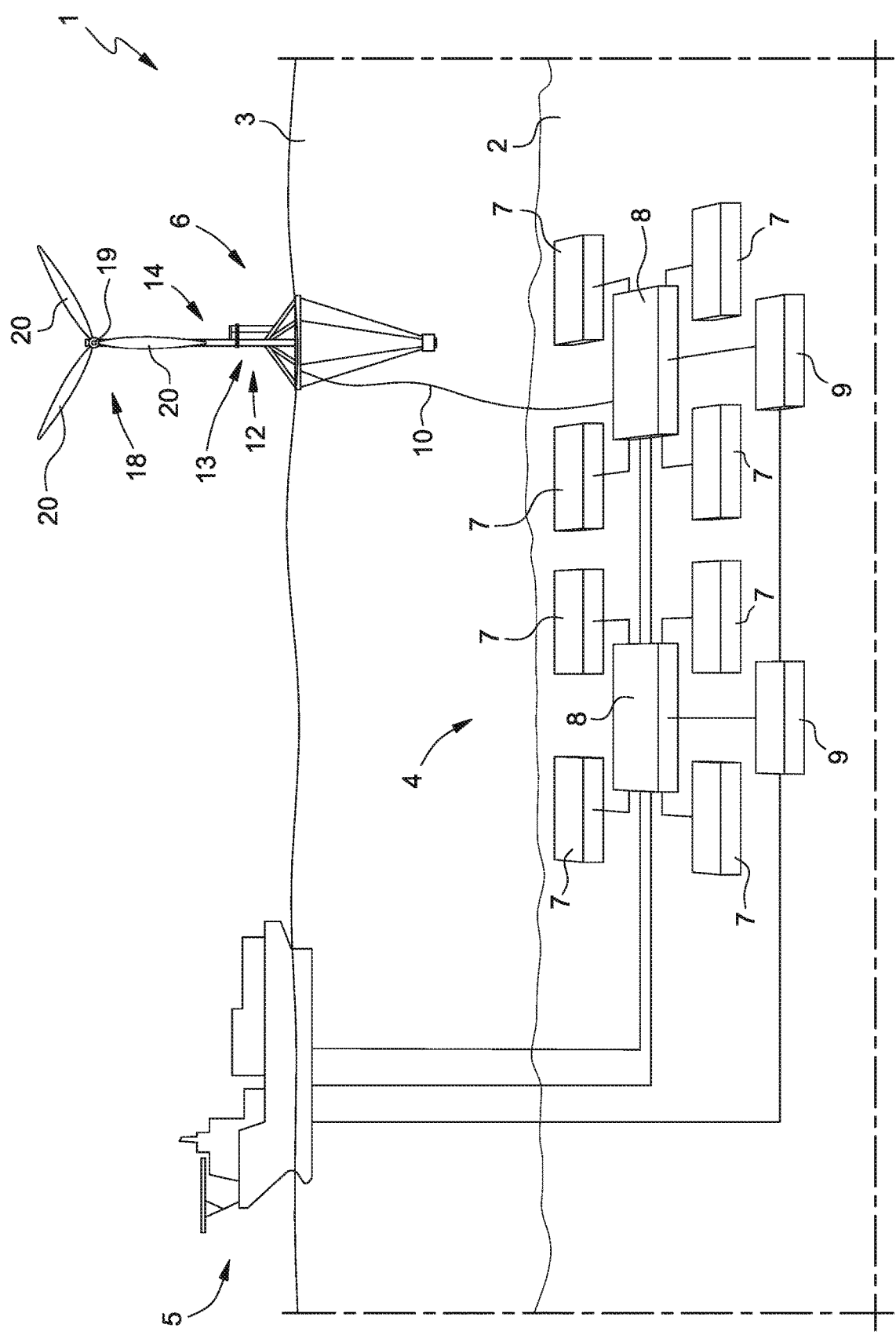
FIG. 1 is a schematic view, with parts removed for clarity, of an oil and gas production system made in accordance with this disclosure.

With reference to FIG. 1, the reference number 1 indicates, as a whole, an oil and gas production system arranged, in part, on the bed 2 of a body of water 3 and, in part, floating in the body of water 3.

The system 1 comprises an underwater oil and gas production facility 4 arranged on the bed 2 of the body of water 3; a vessel 5 connected to the underwater oil and gas production facility 4; and an offshore assembly 6 to supply electricity and chemicals to the underwater oil and gas production facility 4.

In the illustrated example, the underwater oil and gas production facility 4 comprises a number of well heads 7; two production assemblies 8; and two injection well heads 9.

Each production assembly 8 comprises a number of pieces of equipment that absorb energy, such as, for example, production pumps, separators, compressors, injection pumps, electrically controlled valves, and is connected with four well heads 7 and an injection well head 9. The well heads 7 feed extracted oil and gas to the production assembly 8, which distributes energy to all the well heads 7, to the injection well head 9 and to all the pieces of equipment that absorb energy within the production assembly, and supplies the chemicals to the injection well heads 9, to the well heads 7 and to any point of the system 4 where chemicals are required. The production assemblies 8 are connected to each other and to the vessel 5 for transferring the processed oil and gas to the vessel 5.

The vessel 5 is connected to the injection well heads 9 to feed water to be injected into the injection wells to stimulate the recovery of oil and gas from the reservoir with secondary and tertiary recovery methods.

In particular, the vessel 5 is an FPSO (Floating Production Storage and Offloading) unit generally used in the exploitation of underwater oil and gas reservoirs.

The offshore assembly 6 has the function of generating electricity and of supplying electricity and chemicals to the underwater oil and gas production facility 4. In FIG. 1, the electricity and the chemicals are supplied by an umbilical 10. In addition, the umbilical 10 also has the function of exchanging control signals, and any hydraulic fluids, with the system 4.

Figure 2:
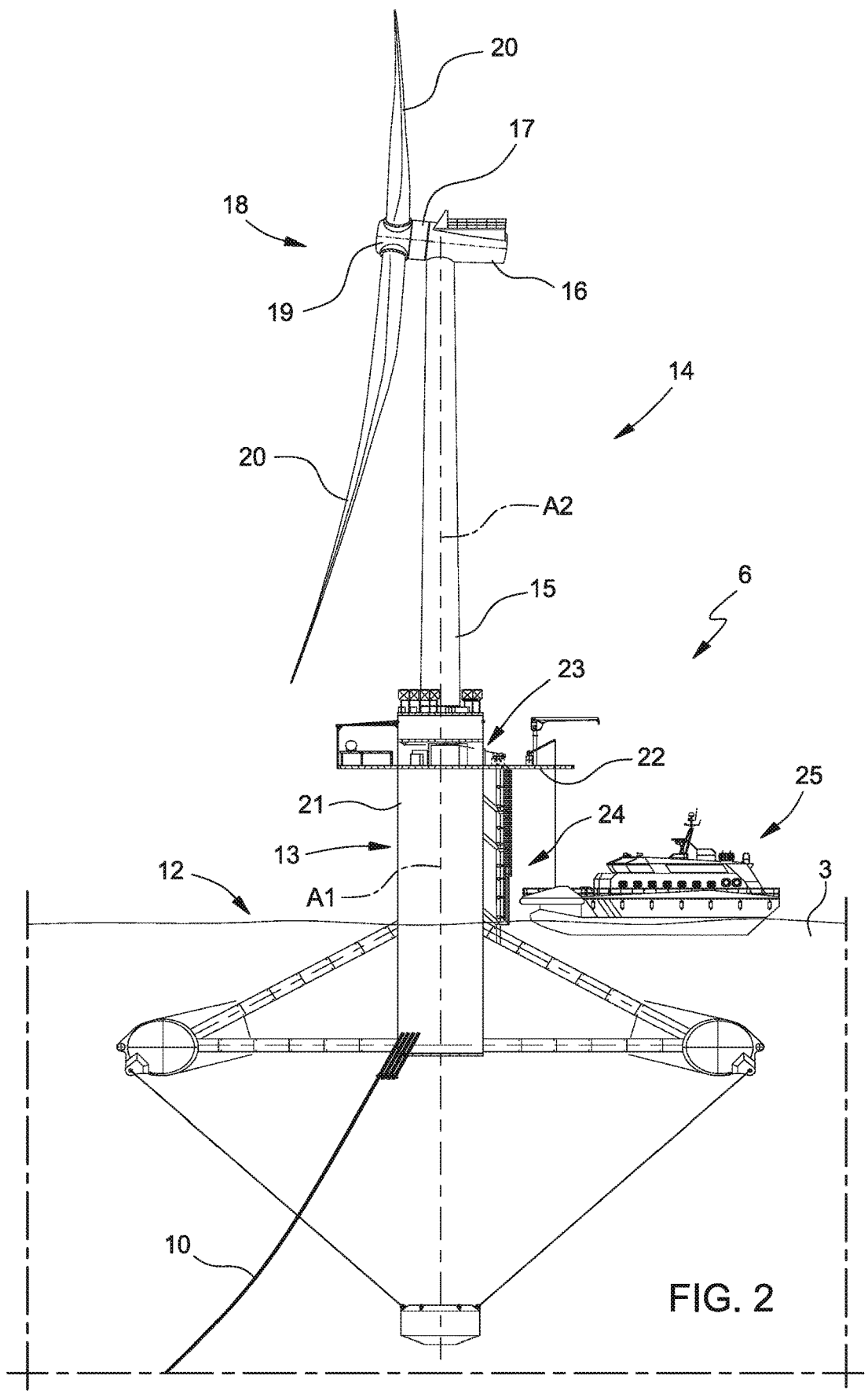
FIG. 2 is a schematic view, on an enlarged scale and with parts removed for clarity, of an offshore assembly of the system in FIG. 1.

With reference to FIG. 2, the offshore assembly 6 comprises a semi-submersible support structure 12, which comprises a tubular portion 13 that extends along a longitudinal axis A1; and a wind turbine 14 mounted on the tubular portion 13. In the illustrated example, the semi-submersible support structure 12 is the one described in the patent application WO 2019/106,293, though the semi-submersible support structure 12 can assume configurations other than that illustrated and has the function of maintaining the tubular portion in a relatively vertical position in a semi-submersed configuration.

The wind turbine 14 comprises a tower 15 that extends along a longitudinal axis A2 aligned with the longitudinal axis A1; a nacelle 16 mounted so that the nacelle swivels at the upper end of the tower 15; a rotating electric machine 17 mounted on the nacelle 16; and a blade assembly 18, which swivels in relation to the nacelle 16 and comprises a hub 19, and a number of blades 20.

The tubular portion 13 is semi-submersible and has a cylindrical wall 21. The semi-submersible support structure 6 comprises a platform 22, which is fixed around the tubular portion 13 near the upper end of the tubular portion 13. The platform 22 extends for 360° around the tubular portion 13, which has an access door 23 through the cylindrical wall 21 for placing the platform 22 in communication with the space inside the tubular portion 13.

The semi-submersible support structure comprises an outer ladder 24 that extends from the platform 22 downwards along the cylindrical wall 21 up to a mooring zone of a service vessel 25.

Figure 3:
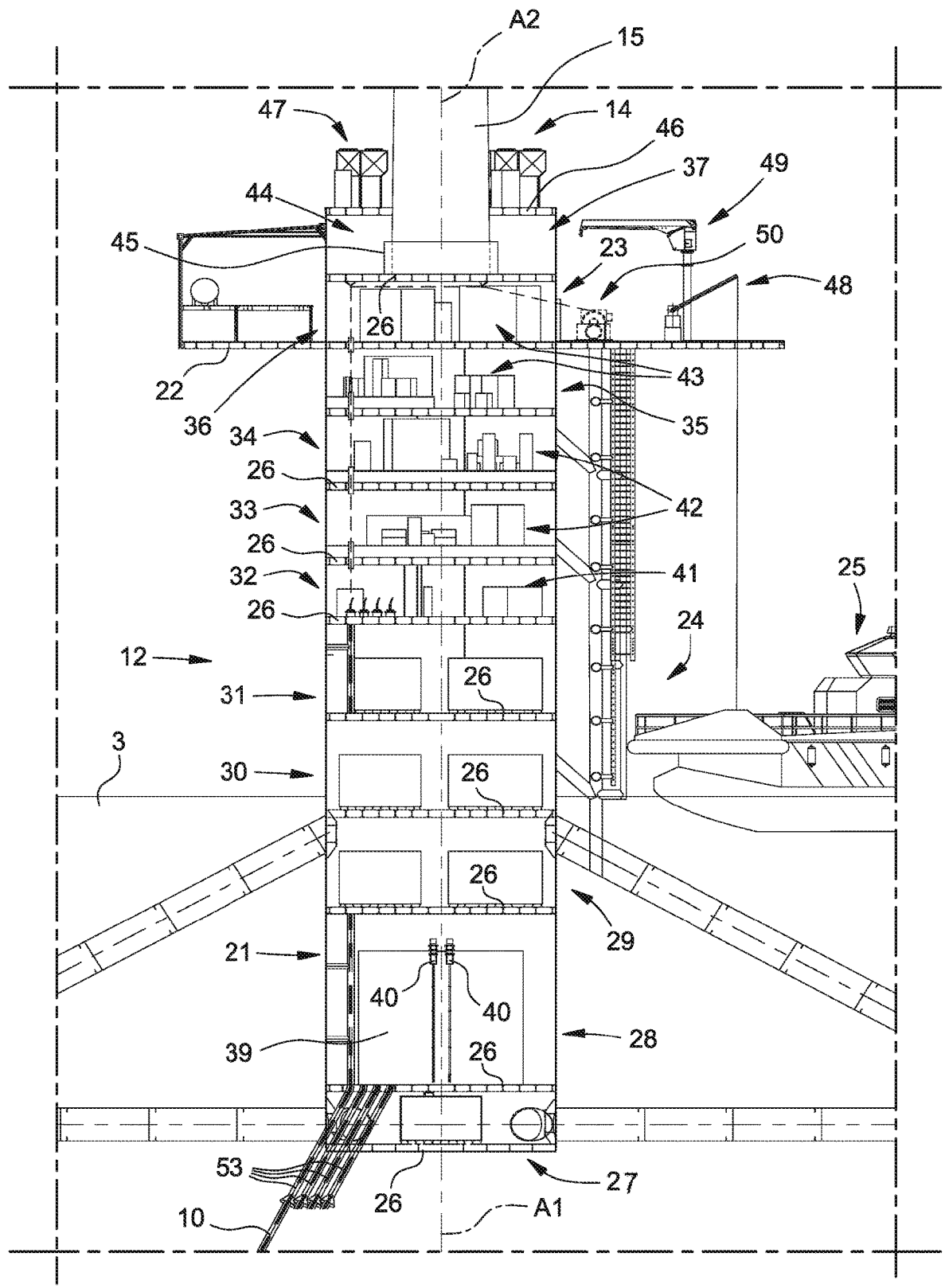
FIG. 3 is a lateral elevation view, on an enlarged scale and with parts removed for clarity and parts in cross-section, of a detail of the offshore assembly in FIG. 2.

With reference to FIG. 3, the tubular portion 13 comprises partitions 26 distributed along the axis A1 so as to vertically partition the space inside the tubular portion 13.

In this way, the tubular portion 13 comprises a number of compartments 27, 28, 29, 30, 31, 32, 33, 34, 35, 36, and 37 that are aligned one above the other along the axis A1. Each of the compartments 27, . . . , 37 is laterally delimited by the cylindrical wall 21 and by the partitions 26 above and below.

The compartments 27, . . . , 37 communicate with each other through the partitions 26. The compartment 36 is positioned at the height of the platform 22 and is the only one to be in communication with the outside through the access door 23.

The compartment 27 is hermetically sealed by the other compartments 28, . . . , 37.

The compartment 28 houses a fuel tank 39 and two fuel pumps 40.

The compartments 29, 30, and 31 are arranged in succession above the compartment 29 and are designed to contain chemicals that are used in the production of oil and gas in the underwater oil and gas production system 4 (FIG. 1). In particular, the chemicals used in the oil and gas production comprise:

Wax inhibitors;
Solvents;
H2S Scavenger;
Monoethylene glycol;
Scale inhibitors;
Asphaltenes;
De-emulsifiers;
Methanol;
Corrosion inhibitors;
Biocides.

Each chemical is housed in a respective tank. The list of chemicals is not exhaustive and the chemicals may vary depending on requirements. Some of these chemicals are flammable at relatively low temperatures.

The compartment 32 houses, at least in part, a cooling and ventilation system 41 that extends along the tubular portion 13 in order to cool and ventilate the compartments 28, . . . , 37.

The compartments 33 and 34 house a control unit 42 configured to manage the electricity produced on board the offshore assembly 6, the chemicals supplied to the underwater oil and gas production system 4 (FIG. 1) and the processes implemented by the underwater oil and gas production system 4 (FIG. 1).

The compartments 35 and 36 house static electrical power equipment 43, such as, for example, transformers, inverters, configured to transform electricity and making it usable for the facilities on board the offshore assembly 6 and the underwater oil and gas production system 4 (FIG. 1).

The compartment 37 houses various machines 44.

The partition 26 that delimits the compartment 37 below has a ring shape and has a pocket 45 with a seat turned upwards for housing the base of the tower 15 of the wind turbine 14 and fixing the tower 15 via a bolted joint.

The compartment 36 is delimited below by a partition 26 arranged on the same plane as the platform 22 and communicates with the outside via the access door 23.

The tubular portion 13 has a ring-shaped platform 46 that extends around the tower 15 and supports, in the upper part of the tubular portion 13, heat exchangers 47 of the cooling system 41.

The semi-submersible support structure 12 supports lifting gear along the platform 22, such as a davit 48; a crane 49 configured to manage the transfer of material from a vessel moored to the platform 22; and a winch 50 configured to manage the lifting of one or more umbilicals 10 inside the tubular portion 13.

Figure 4:
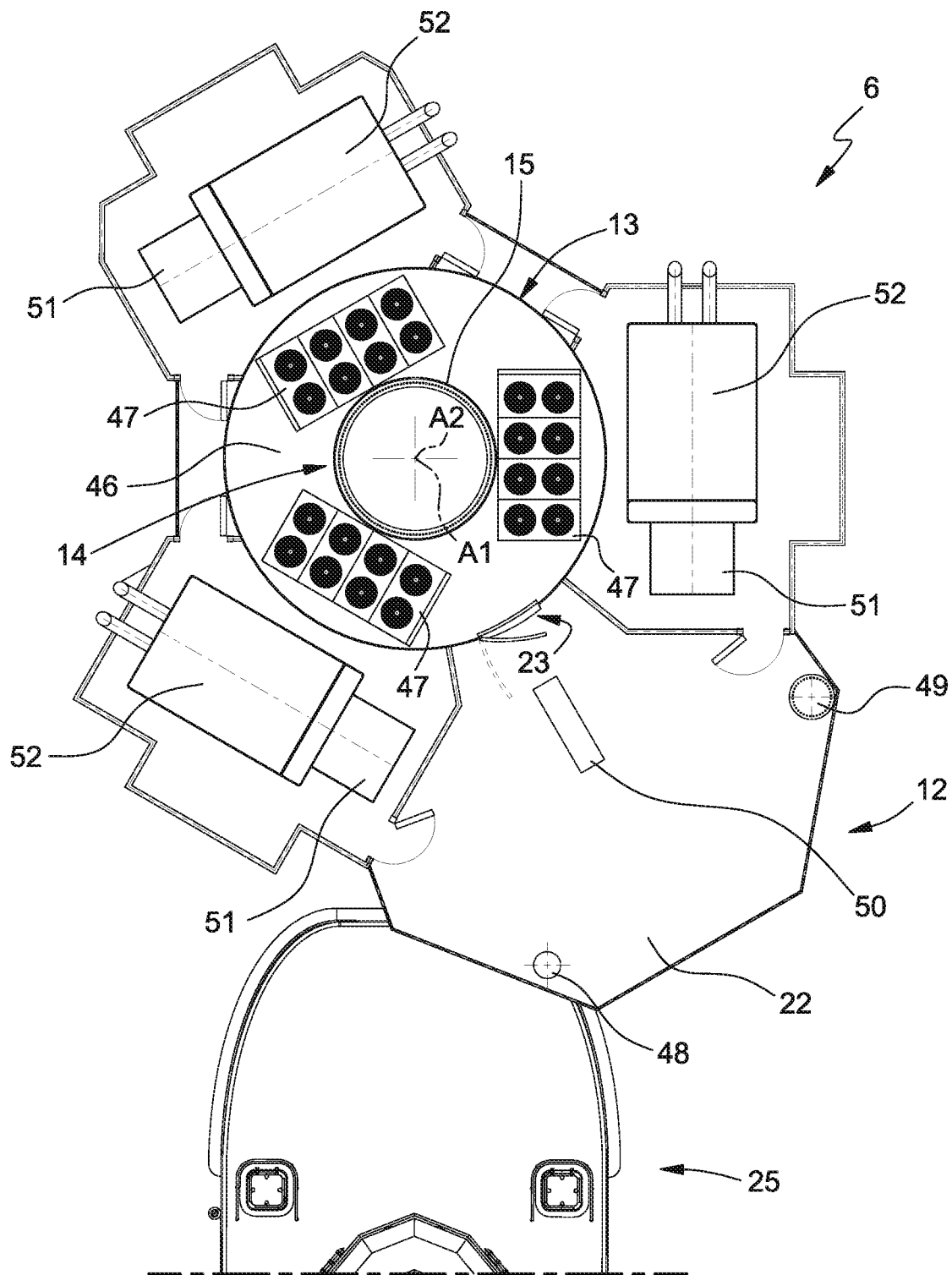
FIGS. 4 and 5 are cross-section views, with parts removed for clarity, of the detail of the offshore assembly in FIG. 3.

According to what is better illustrated in FIG. 4, the semi-submersible support structure 12 supports three back-up electric generators 51 driven by respective endothermic engines 52, which are powered by the fuel from the tank 39 (FIG. 3).

In one embodiment of this disclosure (not illustrated), the electric generators 51 are replaced with solar-powered generators or with energy storage units that temporarily store excess electricity produced by the wind turbine 14. In general, regardless of the nature of the back-up power source, a reserve of electricity is provided that compensates for any dips in electricity produced via the wind turbine 14.

With reference to FIG. 3, the offshore assembly 6 comprises four J-tubes 53 that extend, in part, in the body of water 3 and, in part, inside the tubular portion 13 through part of the partitions 26. Each J-tube 53 is configured to house an umbilical 10 which is configured to transfer signals, electric power, and chemicals in the liquid state and any hydraulic fluids. Alternatively, the umbilical is configured to house a cable.

The partitions 26 are arranged at various heights inside the tubular portion 13 and are installed, in succession, from the bottom upwards.

In addition, it is possible to set the tubular portion 13 up in different ways according to the number of compartments and height of the compartments depending on the equipment that will be housed in the compartments themselves and how the offshore assembly 6 will be used.

Figure 5:
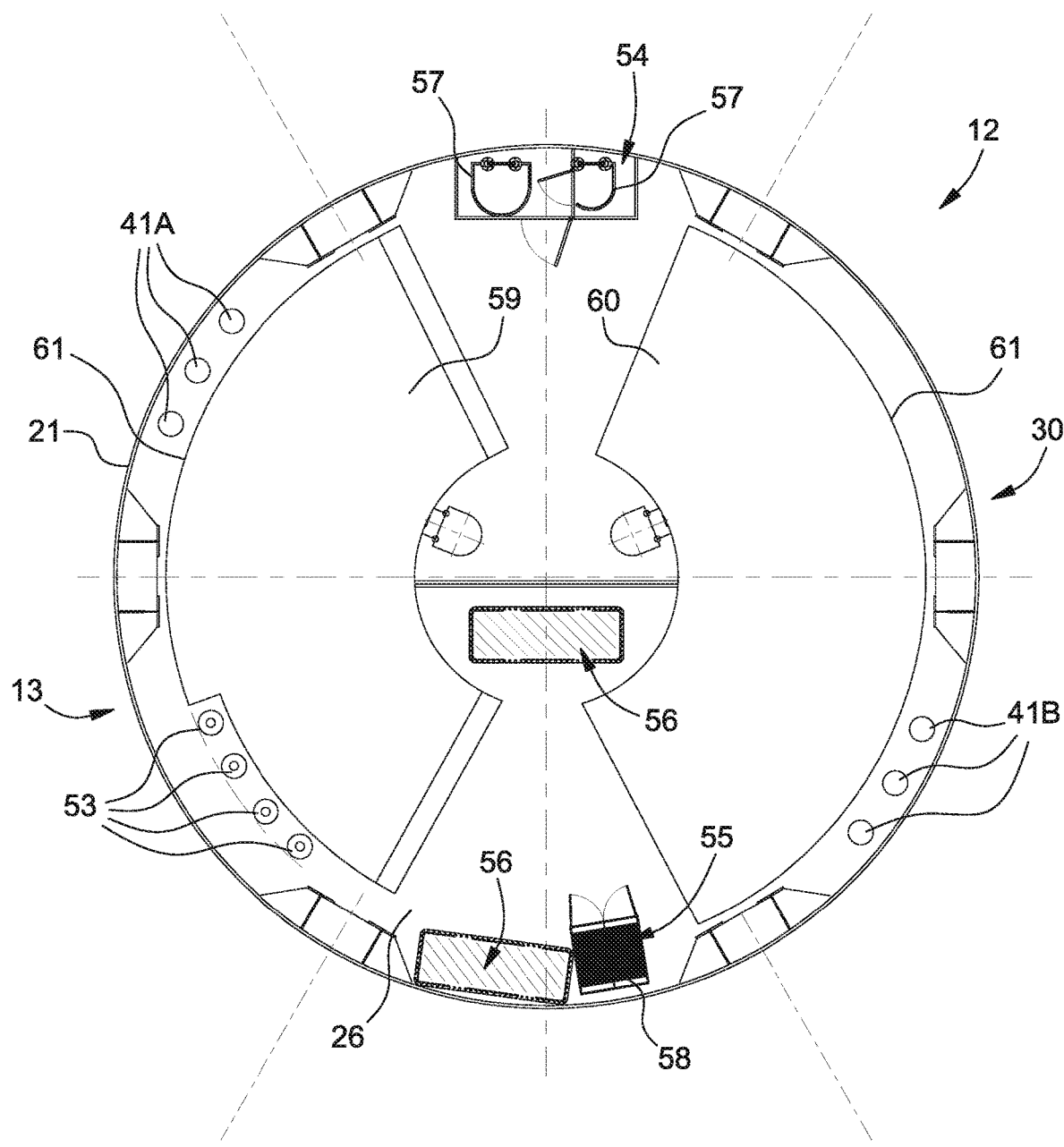
Figure 6:
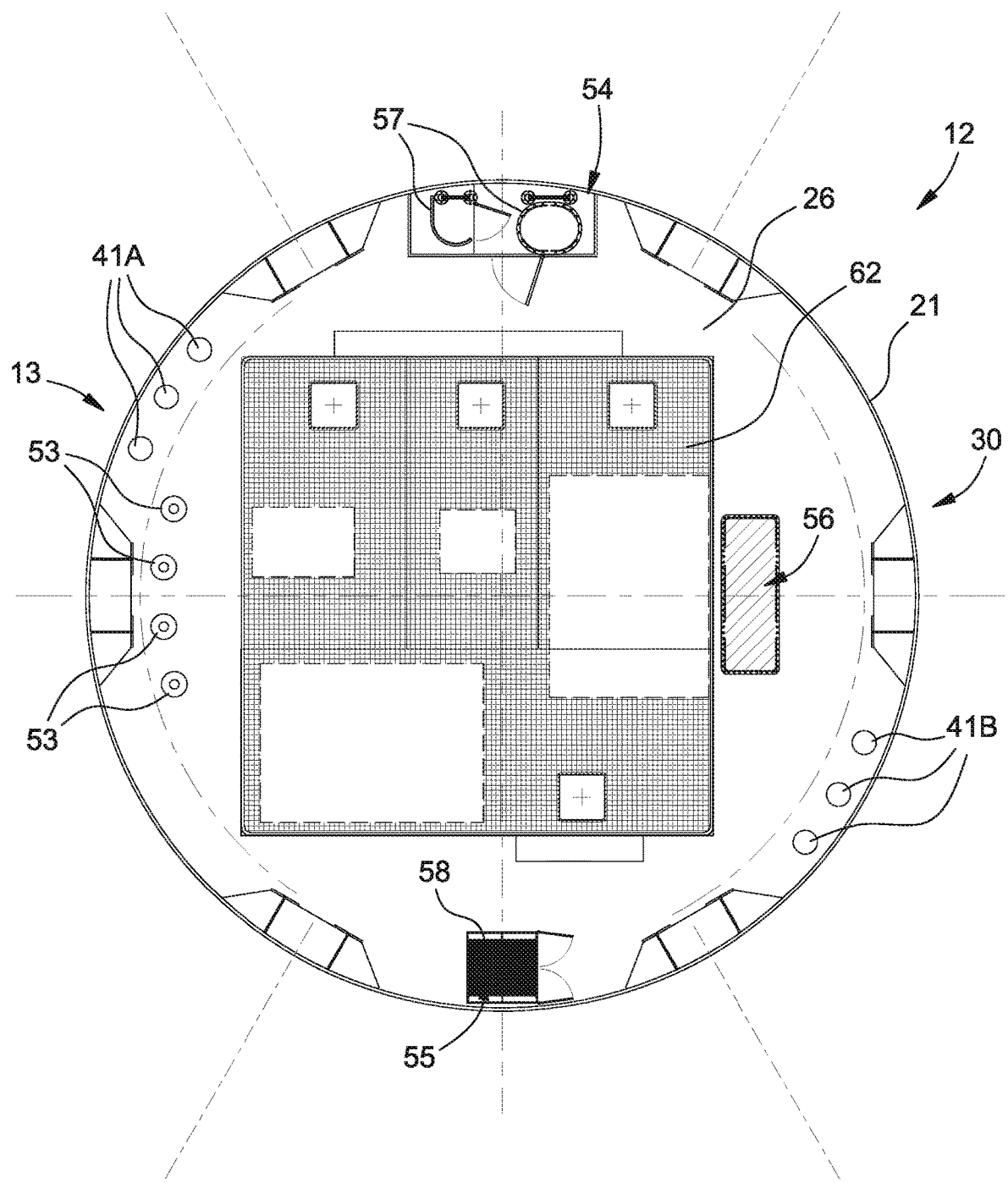
FIG. 6 is a cross-section view, with parts removed for clarity, of a variant of the detail in FIG. 5.

In the example illustrated, the cooling and ventilation system 41 comprises a cooling circuit 41A, visible in part in FIGS. 5 and 6, which extends through the compartments 28, . . . , 37 to ensure relative optimal conditions for the operation of the equipment and materials housed in the compartments 28, . . . , 37; and a ventilation circuit 41B, visible in part in FIGS. 5 and 6, configured to exchange air in the compartments 28, . . . , 37.

The control unit 42 also has a circuit (not illustrated), that extends into the compartments 28, . . . 37 for managing the operations of the equipment contained in the compartments 28, . . . 37.

With reference to FIG. 5, the compartments 28, . . . , 37 are in communication with each other via openings 54, 55, 56 made in the partitions 26 to enable the transfer of people and/or small objects and, basically, to perform maintenance operations. In particular, the opening 54 arranged near the lateral wall 21 enables the passage of ducts 57 provide with stairs for people to pass; the opening 55 arranged near the lateral wall 21 enables a lift 58 to pass in order to transfer people and small spare parts and tools for maintenance operations; and the openings 56 enable the passage of spare parts and equipment transferred using winches (not illustrated in the drawings).

The lift 58 comprises a platform, which is movable through the compartments from 28 to 37 (FIG. 3) and is driven using a cable system that is not illustrated in the appended figures.

With reference to FIG. 5, the compartment 30 houses two tanks 59 and 60, each of which has, in plan, the shape of a circular crown sector and is provided with an outer wall 61, which is parallel and concentric to the cylindrical wall 21 and is arranged at a distance from the cylindrical wall 21. Both the tanks 59, 60 extend along an arc of a circle that is less than 180°. The tank 59 has a recess in the outer wall 61 for enabling the J-tubes 53 to pass.

With reference to the variant in FIG. 6, a different compartment 30 layout is illustrated. The partition 26 that defines the floor of the compartment 30 has the openings 54, 55, and 56. In contrast to FIG. 5, the partition 26 has a single opening 56 and just one tank 62, which is configured to contain chemicals in their liquid state and is rectangular in plan. In the illustrated example, the tank 62 is arranged at the center of the partition 26.

In general, the tanks may assume different shapes depending on the different layout needs.

Figure 7:
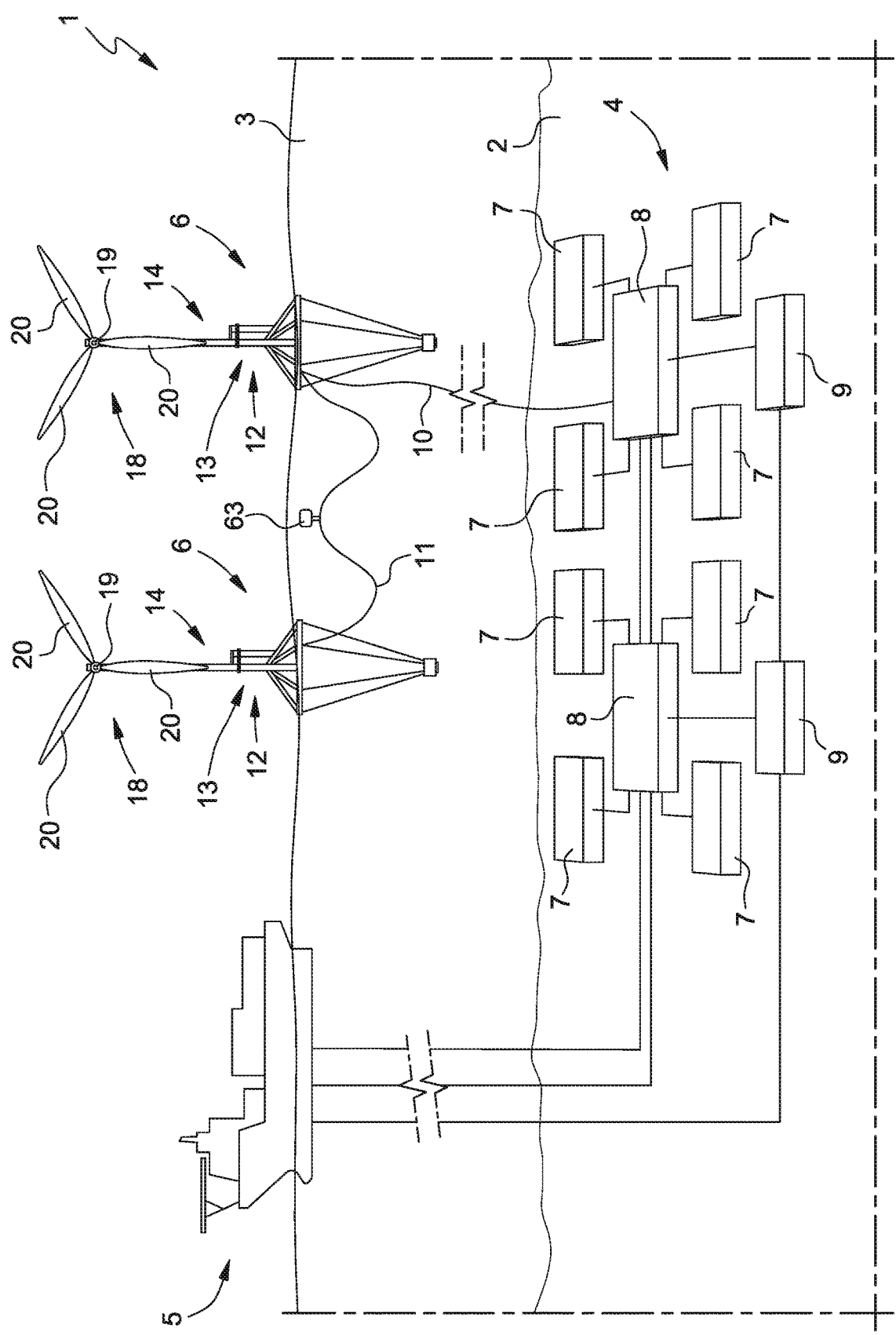
FIG. 7 is a schematic view, with parts removed for clarity, of a variant of the oil and gas production system in FIG. 1.

With reference to the variant in FIG. 7, the oil and gas production system 1 comprises two offshore assemblies 6 connected to each other via an umbilical 11. Only one of the offshore assemblies 6 is connected with the underwater oil and gas production facility via the umbilical 10. The umbilical 11 is supported in an intermediate position by a submersed buoy 63.

In use, and with reference to FIG. 1, the wind turbine 14 is dimensioned to supply electric power for the operation of the oil and gas production system 1. If just one wind turbine 14 is not enough to supply the necessary power, two or more offshore assemblies 6 are connected to supply the energy needs as illustrated in FIG. 7.

Since the wind conditions are not constant, the overall energy supplied by each wind turbine 14 can vary significantly and not be enough to ensure what is required. In this case, one or more back-up generators 51 are activated to meet the electricity demands (FIG. 4).

The static electrical power equipment 43 (FIG. 3) provide for the transformation of energy to make it usable for various oil and gas production system 1 facilities. The control unit 42 (FIG. 3) controls the oil and gas production system 1 and the supply of chemicals to the underwater oil and gas production facility 4, and any hydraulic fluids.

The cooling and ventilation system 41 (FIG. 3) makes it possible to control the temperature in the compartments 28, . . . , 37 and to change the air in the compartments themselves so as to ensure that all the operations and functions of the offshore assembly are carried out in relative perfect safety.

It is apparent, finally, that variations with respect to the embodiments described can be made to this disclosure without departing from the scope of protection of the appended claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. An offshore assembly to supply electricity and chemicals through at least one umbilical to an underwater oil and gas production facility, the offshore assembly comprising:
a wind turbine configured to generate electricity, the wind turbine equipped with a tower, a nacelle and a blade assembly;
a semi-submersible support structure arrangeable in the body of water, the support structure comprising a tubular portion, wherein a plurality of compartments are vertically arranged within the tubular portion, each of the compartments is configured to house equipment to perform a function, at least one of the compartments houses at least one tank configured to contain chemicals, and a cooling and ventilation system is configured to cool and ventilate the plurality of compartments; and
a back-up power source mounted on the support structure and configured to generate electricity, wherein at least one of the compartments houses static electrical power equipment operable to make available the electricity generated by at least one of the wind turbine and the back-up power source.

2. The offshore assembly of claim 1, wherein the tubular portion comprises a cylindrical wall which laterally delimits the plurality of compartments.

3. The offshore assembly of claim 1, further comprising a quantity of partitions housed in the tubular portion that delimit above and below at least one of the plurality of compartments.

4. The offshore assembly of claim 3, further comprising a plurality of ducts extending along the tubular section to enable access to the compartments, wherein the partitions define first openings to enable the passage of the ducts.

5. The offshore assembly of claim 3, further comprising a mobile lift along the tubular section, wherein partitions define second openings to enable a transit of the mobile lift between the compartments.

6. The offshore assembly of claim 3, wherein the partitions define third openings to enable material to pass through.

7. The offshore assembly of claim 3, further comprising at least two J-tubes extending partly into the body of water and partly within the tubular portion and through at least one of the partitions, each J-tube being configured to house at least one of the at least one umbilical and a cable.

8. The offshore assembly of claim 3, wherein at least one of the partitions is attached to a pocket configured to house and be joined to a lower end of the tower of the wind turbine.

9. The offshore assembly of claim 1, further comprising a platform arranged about the tubular portion and configured to house the back-up power source.

10. The offshore assembly of claim 9, further comprising a lifting gear supported by the platform.

11. An oil and gas production system from a reservoir located in a bed of a body water, the oil and gas production system comprising:
an underwater hydrocarbon production facility which is located on the bed of the body of water and is electrically operated and provides treatments comprising an injection of chemicals; and
an offshore assembly to supply electricity and chemicals through an umbilical to the underwater oil and gas production facility, the offshore assembly comprising: a wind turbine configured to generate electricity, the wind turbine equipped with a tower, a nacelle and a blade assembly, a semi-submersible support structure arrangeable in the body of water, the support structure comprising a tubular portion, wherein a plurality of compartments are vertically arranged within the tubular portion, each of the compartments is configured to house equipment to perform a function, at least one of the compartments houses at least one tank configured to contain chemicals, and a cooling and ventilation system is configured to cool and ventilate the plurality of compartments; and a back-up power source mounted on the support structure and configured to generate electricity, wherein at least one of the compartments houses static electrical power equipment operable to make available the electricity generated by at least one of the wind turbine and the back-up power source.

12. The oil and gas production system of claim 11, further comprising a control unit housed in at least one of the compartments and configured to manage operations of the wind turbine, the back-up power source, and the underwater hydrocarbon production facility.

13. The oil and gas production system of claim 11, wherein each compartment defines a circular shape and each tank comprises a cylindrical outer wall parallel to a cylindrical wall of the tubular portion.

14. The oil and gas production system of claim 11, further comprising a fuel tank housed in at least one of the compartments located in a lower part of the tubular portion, wherein the backup power source is an electric generator driven by an endothermic engine.

15. The oil and gas production system of claim 11, further comprising an additional offshore assembly connected to the offshore assembly by another umbilical, the additional offshore assembly comprising:
another semi-submersible support structure arrangeable in the body of water, the other support structure comprising another tubular portion, wherein another plurality of compartments are vertically arranged within the other tubular portion, each of the compartments is configured to house equipment to perform a function and another cooling and ventilation system is configured to cool and ventilate the other plurality of compartments;
another wind turbine configured to generate electricity, the other wind turbine equipped with another tower, another nacelle and another blade assembly; and
anther back-up power source mounted on the other semi-submersible support structure and configured to generate electricity.

16. A method of production of hydrocarbons from a reservoir in a bed of a body of water, the method comprising:
extracting hydrocarbons from a well in the bed of the body of water by an underwater oil production facility which is located on the bed of the body of water and is electrically driven and involves the injection of chemicals; and
supplying electricity and chemicals from an offshore assembly through an umbilical to the underwater oil and gas production facility, the offshore assembly comprising a wind turbine configured to generate electricity, the wind turbine equipped with a tower, a nacelle and a blade assembly, a semi-submersible support structure arrangeable in the body of water, the support structure comprising a tubular portion, wherein a plurality of compartments are vertically arranged within the tubular portion, each of the compartments is configured to house equipment to perform a function, at least one of the compartments houses at least one tank configured to contain chemicals, and a cooling and ventilation system is configured to cool and ventilate the plurality of compartments; and a back-up power source mounted on the support structure and configured to generate electricity, wherein at least one of the compartments houses static electrical power equipment operable to make available the electricity generated by at least one of the wind turbine and the back-up power source.

17. The method of claim 16, further comprising controlling the underwater hydrocarbon production facility by a control unit located in at least one of the plurality of compartments and connected to the underwater hydrocarbon production facility by the umbilical.

* * * * *